Figure 1:
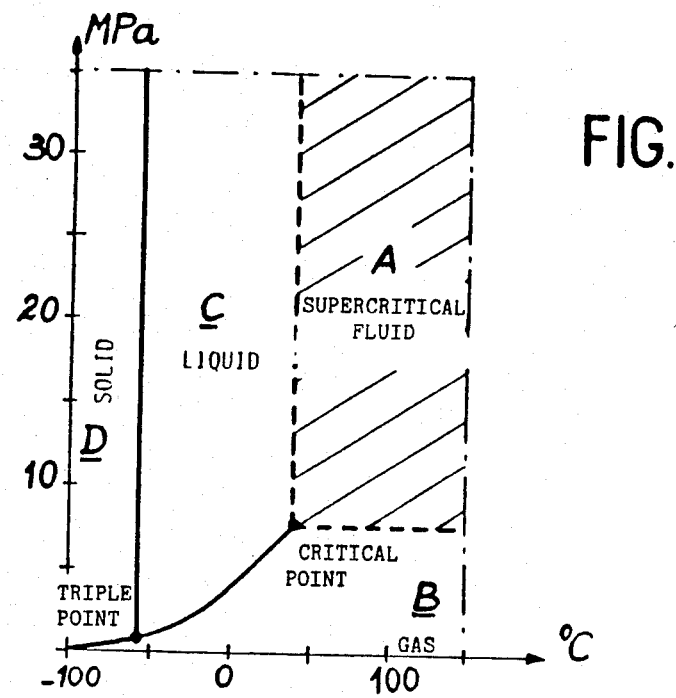

United States Patent [19]
Bethuel et al.

[11] Patent Number: 4,824,570
[45] Date of Patent: Apr. 25, 1989

[54] APPARATUS FOR THE EXTRACTION OF CONSTITUENTS BY A SUPERCRITICAL FLUID OR PRESSURIZED LIQUID

[75] Inventors: Louis Bethuel; Maurice Carles; Roger Neige, all of Pierrelatte, France

[73] Assignee: Commissariat a l'Energie Atomique, Paris, France

[21] Appl. No.: 46,915

[22] PCT Filed: Sep. 2, 1986

[86] PCT No.: PCT/FR86/00295
§ 371 Date: Apr. 2, 1987
§ 102(e) Date: Apr. 2, 1987

[87] PCT Pub. No.: WO87/01299
PCT Pub. Date: Mar. 12, 1987

[30] Foreign Application Priority Data
Sep. 6, 1985 [FR] France ............... 85 13246

[51] Int. Cl.$^4$ ............................................. B01D 11/04
[52] U.S. Cl. ............................... 210/511; 422/260; 210/634
[58] Field of Search ............ 201/33; 422/280, 289, 422/284, 260; 203/49; 208/112 E, 96, 308, 102, 10; 210/634, 511

[56] References Cited

U.S. PATENT DOCUMENTS

| | | | |
|---|---|---|---|
| 3,899,398 | 8/1975 | Cole et al. | 201/33 X |
| 3,969,196 | 7/1976 | Zosiel | 208/308 X |
| 4,402,821 | 9/1983 | Yan | 208/445 X |
| 4,406,778 | 9/1983 | Borza et al. | 208/179 |
| 4,478,705 | 10/1984 | Ganguli | 208/102 X |

Primary Examiner—Frank Spear
Attorney, Agent, or Firm—Oblon, Fisher, Spivak, McClelland & Maier

[57] ABSTRACT

An apparatus for the extraction of constituents present in a substance by means of an extraction fluid constituted by a supercritical fluid or a pressurized liquid. According to this apparatus, in an exterior (3) contacting takes place between the substance and the extraction fluid in order to dissolve the constituents in fluid. The fluid leaving the extractor is then treated to separate the extracted constituents. The fluid is expanded at a pressure $p_1$. Firstly, the less volatile constituents are separated in a liquid-gas separator (41), the separated gas is then liquefied in gas separator-liquefier (13) and the thus liquefied gas is rectified in column (19) to concentrate the extracted constituents in the liquid phase. The extraction fluid can be carbon dioxide gas.

7 Claims, 3 Drawing Sheets

B. 8853

APPARATUS FOR THE EXTRACTION OF CONSTITUENTS BY A SUPERCRITICAL FLUID OR PRESSURIZED LIQUID

The present invention relates to a process for extracting constituents by supercritical fluids or pressurized liquids.

It more particularly applies to the extraction of the following organic constituents.

essential oils and perfumes of fresh or dry flowers or plants, such as lavender, Lavandin, rose, orange flower, jasmine, broom, camomile, mint, etc., aromas such as those of wine, tobacco, hops, pepper, etc.

pharmaceutical products, alkaloids, e.g. caffeine and nicotine from tobacco, natural colorants, and greases and fatty substances such as peanuts, rape, sunflower, etc.

It can also be used for partial water-alcohol separation and for the recovery of petroleum residues, e.g. for the separation of asphaltenes from heavy hydrocarbons using pentane and for the assisted recovery of deposits using methane, nitrogen or carbon dioxide gas.

Extraction processes using supercritical fluids or pressurized liquids consist of using a fluid under adequate pressure and temperature conditions to give said fluid an increased dissolving power compared with the constituents to be extracted. In the case of supercritical fluids, the pressure and temperature conditions are such that the pressure is above the critical pressure and the temperature above the critical temperature.

In the case of pressurized liquids, the pressure and temperature conditions are such that the pressure is above or below the critical pressure and the temperature below the critical temperature.

Throughout the remainder of the present text, the term "extraction fluid" will means that it is a supercritical fluid or pressurized liquid under the afformentioned temperature and pressure conditions.

The use of supercritical fluids offers certain advantages compared with pressurized liquids. Thus, supercritical fluids have a low viscosity and a high diffusivity, which leads to high extraction kinetics. However, pressurized liquids are sometimes of greater interest, because they generally give a more selective extraction and frequently lead to purer extracts. However, the extraction yields are generally lower.

Among the fluids which can be used under supercritical conditions or in the form of pressurized liquids, interest is attached to carbon dioxide gas, because it is non-toxic and causes no particular problems. Moreover, its critical temperature and pressure are not very high, because they respectively correspond to 31° C. and 7.3 MPa. It is also of interest for application in the medical field, the agroalimentary field and the field of perfumes and cosmetics.

In order to carry out this type of extraction, the substance containing the constituents to be extracted is generally introduced into an extractor and in the latter is brought into contact with an extraction fluid raised to the desired temperature and pressure. On leaving the extractor, the extraction fluid consequently contains certain constituents and the latter are recovered by expansion of the fluid at atmospheric pressure, which makes it possible to collect the extraction fluid in gaseous form and to separate the extracted constituents in liquid form. On leaving the separator, the gaseous phase is then compressed and raised to the desired pressure, followed by cooling to the desired temperature and recycling in the extractor. In general, the liquid-gas separator is constituted by a cyclone and the gaseous phase leaving the latter may optionally be processed on several traps: active carbon, absorbing resins, etc. before being recycled into the extractor. This operating procedure is not very effective when the constituents to be extracted are highly volatile, because the latter cannot be easily collected in liquid form during the expansion of the extraction fluid at atmospheric pressure. Thus, during said expansion, the velocity of the fluid increases greatly and can, for example, pass from 1 cm/s to 250 cm/s on passing from a pressure of 15 MPa to 0.1 MPa. This velocity increase leads to the formation of very fine aerosols which cannot be separated in the cyclone separator and are consequently recycled or discharged with the gaseous effluence. To obviate this disadvantage, consideration has been given to the use of two-stage expansion. Firstly the fluid is expanded at a pressure intermediate between atmospheric pressure and the pressure used inthe extractor, followed by the separation of the liquid constituents from the expanded gaseous phase, then the gaseous phase is expanded at atmospheric pressure and the liquid constituents separated from said gaseous phase in a second separator also constituted by a cyclone. This makes it possible to improve the result obtained, but in the case of highly volatile constituents the extraction levels are not adequate.

The present invention relates to a process for extracting constituents by an extraction fluid constituted by a supercritical fluid or a pressurized liquid, which obviates the disadvantages of the aforementioned processes.

The present invention therefore relates to a process for the extraction of at least one constituent present in a substance by means of an extraction fluid constituted buy a supercritical fluid or a pressurized liquid comprising contacting said substance with said fluid in an extractor at a temperature T and a pressure p adequate for dissolving the constituent or constituents in said fluid, then separating the constituent or constituents extracted in said fluid, characterized in that the separation process of said extracted constituent or constituents comprises a first stage consisting of expanding the fluid leaving the extractor at a pressure $p_1$ below pressure p, whilst maintaining it at the desired temperature to obtain said fluid in the gaseous state and part of said extracted constituent or constituents in the liquid state and separating the constituent or constituents in the liquid state from said fluid in the gaseous state and a second stage consisting of liquefying the fluid in the gaseous state separated in this way, rectifying the thus liquefying fluid for concentrating the extracted constituent or constituents in the liquid phase and treating the liquid phase to recover the constituent or constituents by carrying out the liquefaction and rectification operations in a gas separator-liquefier linked by its upper part with a vertical column surmounted by a condenser, so as to wash the gaseous phase discharged by said column by means of the condensed fluid.

By carrying out in accordance with the invention a concentration of the extracted constituents in a liquid phase, there is not loss of volatile products which would occur according to the prior art at the time of liquid-gas separation by entrainments of certain products in the form of aerosols in the gaseous flow.

Moreover, it is easy to recover these concentrated constituents in the liquid phase by subjecting the latter to an evaporation for vaporizing the fluid contained therein and thus solely recovering the constituents in the liquid state. The liquefied phase rectification operation is preferably performed by raising to a slightly higher temperature the upper layer of the liquefied phase present in said separator-liquefier.

By carrying out in accordance with the invention a first separation stage of the extracted constituents, there is an improvement to the efficiency of the separation by firstly recovering the less volatile constituents following expansion at pressure $p_1$ and then recovering after rectification the more volatile constituents, which concentrate in the liquid phase during the rectification operation. The rectification operation can be performed at a pressure $p_2$ below pressure $p_1$ used for the expansion, but generally rectification is carried out at the same pressure as that usef for the expansion of the extraction fluid.

The process according to the invention can also apply to continuously functioning extraction installations, i.e. installations in which the fluid is continuously circulated in the extractor, the extracted constituents then being recovered in the fluid and the fluid is then recycled into the extractor after bringing it to the extraction pressure p and temperature T conditions.

Under these conditions, the process can comprise a first continuous extraction and separation phase of the constituent or constituents, which consists of expanding the fluid leaving the extractor at a pressure $p_1$ below the extraction pressure p, whilst maintaining it at the desired temperature to obtain said fluid in the gaseous state and part of said constituent or constituents in the liquid state, then separating said fluid in the gaseous state from the constituent or constituents in the liquid state and recycling into the extractor the thus separated fluid in the gaseous state, after bringing it to the extraction pressure p and temperature T conditions and a second final stage, in which all the fluid circulating in the extractor is treated to recover the constituent or constituents contained therein. This second phase consists of subjecting all the fluids circulated in the extractor to the two-stage separation process described hereinbefore, which comprises a first stage of expanding the fluid leaving the extractor at a pressure $p_1$ below the extraction pressure, whilst maintaining it at the desired temperature to obtain said fluid in the gaseous state and part of the constituent or constituents in the liquid state, separating said fluid in the gaseous state from the constituent or constituents in the liquid state and a second stage consisting of liquefying the fluid in the gaseous state separated in this way, rectifying the thus liquefied fluid for concentrating in the liquid phase the remaining extracted constituent or constituents and recovering the latter in said liquid phase.

This makes it possible to continuously extract the less volatile constituents, which easily separate from the fluid in the gaseous state during expansion at pressure $p_1$ and at the end of the operation recover the more volatile constituents by concentrating them in the liquid phase during the liquefaction-rectification operation.

In the process according to the invention, the extraction fluid is chosen as a function of the constituents to be extracted and the temperature and pressure conditions necessary for obtaining the dissolving of the constituents to be extracted.

As has been seen hereinbefore, the extraction fluid can be constituted by a supercritical fluid or a pressurized liquid. Preference is given to the use of a supercritical fluid, i.e. operating at a temperature T above the critical temperature and at a pressure p above the critical pressure.

For example, the extraction fluid can be constituted by carbon dioxide gas $CO_2$, water, n-pentane, chlorotrifluoro methane and sulphur hexafluoride. Generally carbon dioxide gas $CO_2$ is used, because its critical temperatue and pressure are not too high.

If carbon dioxide gas is used as the extraction fluid, pressure $p_1$ is generally in the range 3 to 6 MPa.

The invention also relates to an apparatus for the extraction of at least one of the constituents present in a substance by means of an extraction fluid constituted by a supercritical fluid or a pressurized liquid, comprising an extractor within which can be placed said substance, means for circulating the extraction fluid in said extractor under pressure p and temperature T conditions adequate for dissolving the constituent or constituents of the substance in said fluid and a discharge pipe for the extraction fluid leaving the extractor equipped with a relief valve and characterized in that said pipe is connected to the lower part of a gas separator-liquefier provided with cooling means linked by its upper part with a vertical column surmounted by a condenser, said gas separator-liquefier being provided in its lower part with means for withdrawing a liquefied phase present in said separator-liquifier and in that a gas-liquefier separator is interposes on the gas circuit between the relief valve and the gas separator-liquefier.

Preferably, the condenser located at the upper end of the column is surmounted by a heat exchanger makint it possible to raise the gas leaving the condenser to a higher temperature.

Moreover, the cooling means of the gas separator-liquefier make it possible to cool the lower part thereof to a lower temperature than the upper part thereof. Generally, the gas-liquid separator is a cyclone separator.

The extraction apparatus according to the invention can be designed to continuously extract and separate constituents of a substance by means of an extraction fluid treated at the extractor outlet in order to separate therefrom part of the extracted constituents and then recycle same in the extractor at the desired extraction temperature and pressure.

According to a first embodiment of an apparatus of this type, it comprises: a closed main circuit having in series the extractor, said relief valve, a gas-liquid separator and means for recycling the gas leaving said separator into said extractor at the extraction temperature T and pressure p and a gas separator-liquefier linked by its upper part with a vertical column surmounted by a condenser, said gas separator-liquefier being branched on to the main circuit by means of a pipe having a valve issuing into said main circuit between the gas-liquid separator and said means for recycling the gas in the extractor.

With an apparatus of this type, the more volatile constituents remaining in the gaseous phase during the liquid-gas separation are recycled with the fluid into the extractor and concentrate in the main circuit. At the end of the operation, recovery takes place of the more volatile constituents by treating the fluid leaving the extractor in the gas liquefier-separator during the emptying of the installation. Thus, at the end of the operation it is possible to recover the more volatile constituents, which are often the essential constituents for the organoleptic qualities of an aroma or perfume. Thus, the absence of a constituent at concentrations of a few parts per million often denatures the quality of an aroma or perfume.

According to a second embodiment of a continuously operating extraction apparatus, it comprises: a closed main circuit having in series the extractor, said relief valve, the gas-liquid separator and means for recycling the gas leaving said separator into said extractor at extraction temperature T and pressure p, a gas separator-liquefier linked by its upper part with a vertical column surmounted by a condenser means for continuously discharging into a container the liquid phase separated in said gas-liquid separator and means for connecting the upper part of the container to the gas liquefier-separator in order to treat therein the gas able to pass from the liquid-gas separator into the container.

In the case of this apparatus, it is possible to continuously withdraw the constituents extracted at the liquid-gas separator and gas separator-liquefier is branched at said liquid-gas separator. In this case, permanent treatment takes place of an aliquot part of the gas from the gas-liquid separator, in order to recover the more volatile constituents remaining in the gaseous phase.

According to a third embodiment of a continuously operating apparatus according to the invention, the latter comprises: a closed main circuit having in series the extractor, said relief valve, a gas-liquid separator, a gas separator-liquefier linked by its upper part with a vertical column surmounted by a condenser and means for recycling the gas leaving said condenser into the said extractor at the extraction temperature T and pressure p, means for discontinuously sampling the liquid phase present in the gas separator-liquefier, means for evaporating the sampled liquid phase and means for recycling the gas separated during the evaporation of the liquid phase sampled in the main circuit between the condenser and the means for recycling the gas into the extractor.

With this arrangement, it is possible to permanently treat the fluid leaving the extractor in order to firstly separate the less volatile constituents in the liquid-gas separator and then recover the more volatile constituents in the gas separator-liquefier. In this case, to maintain the fluid quantity circulating in the main circuit at the desired value, it is necessary to treat the liquid phase present in the gas liquefier in order to separate therefrom the fluid contained therein and recycle it into the main circuit.

Other features and advantages of the invention can be gathered from the following description relative to non-limitative embodiments and with reference to the attached drawings, which include:

FIG. 1 The phase diagram of the carbon dioxide gas.

Figure 2:
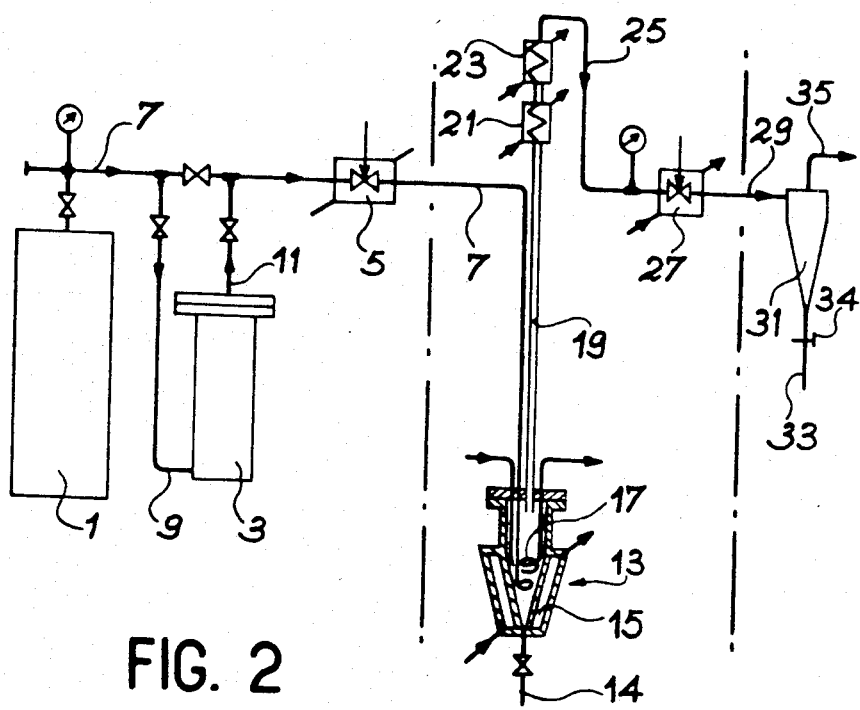

FIG. 2 Diagrammatically an extraction installation not according to the invention.

Figure 3:
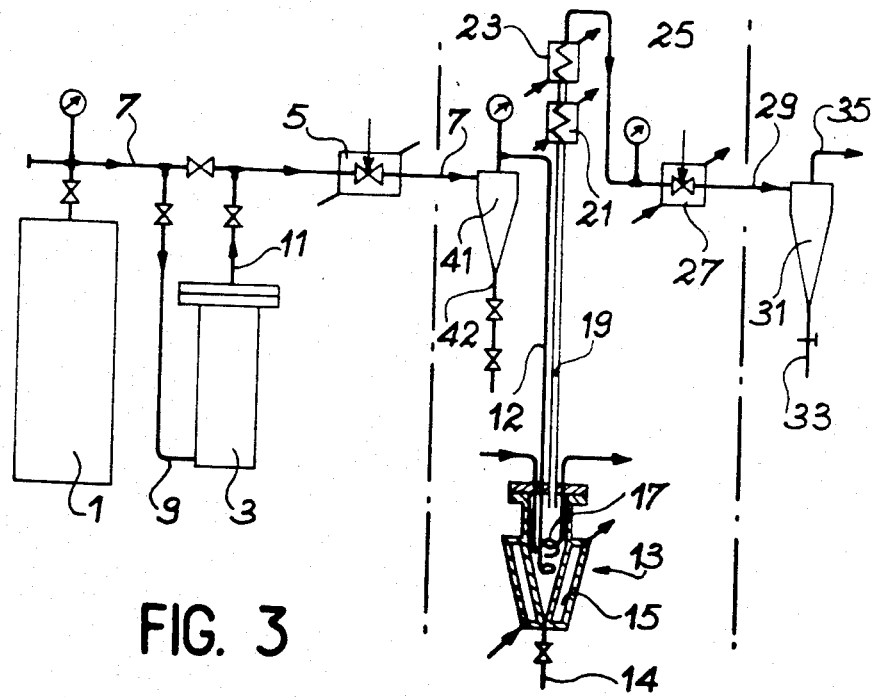

FIG. 3 An extraction installation according to the invention.

Figure 4:
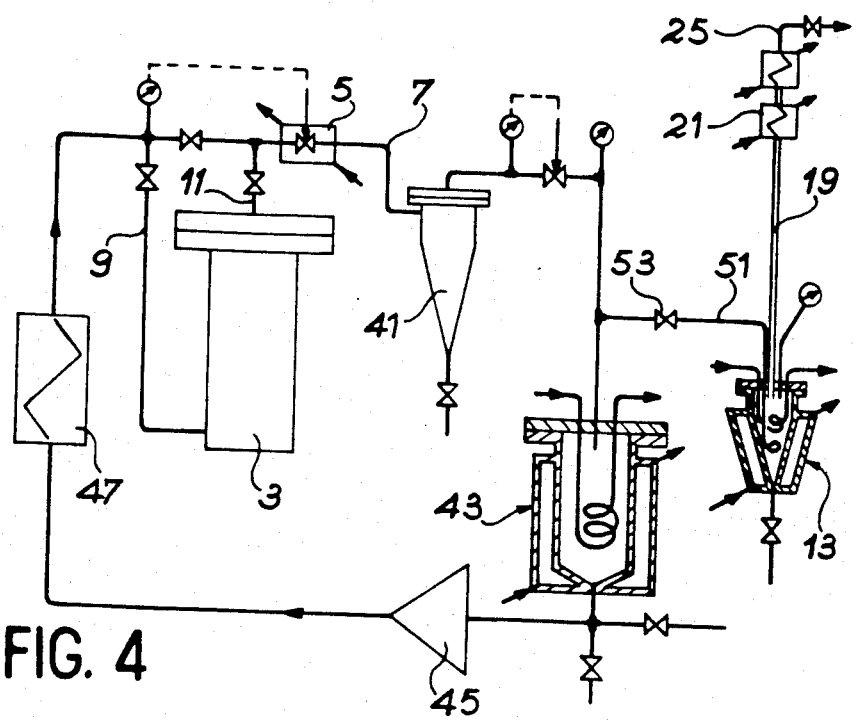

FIG. 4 A first embodiment of a continuous extraction installation according to the invention.

Figure 5:
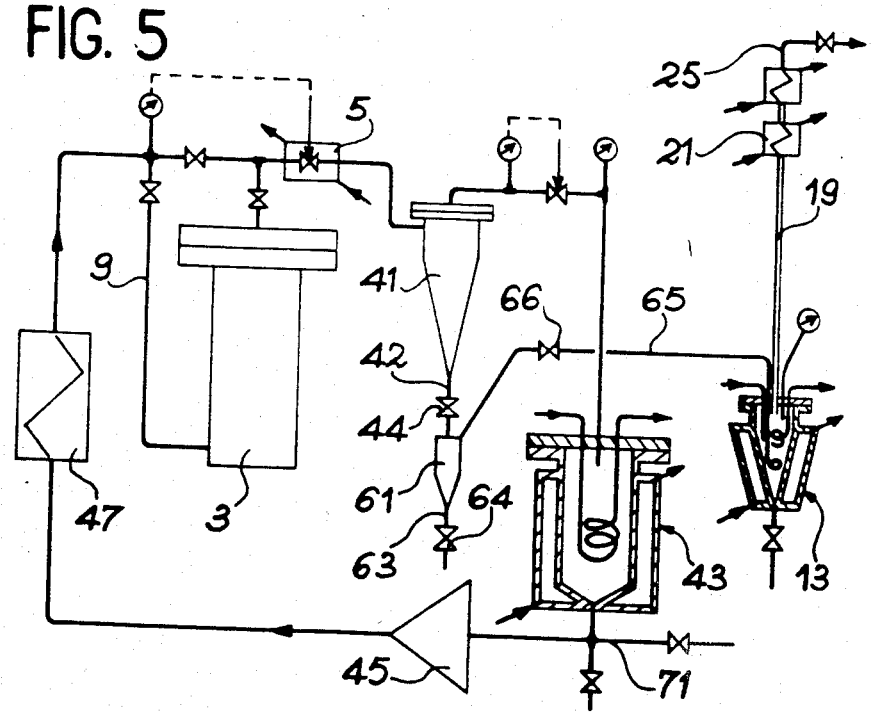

FIG. 5 A second embodiment of a continuous extraction installation according to the invention.

Figure 6:
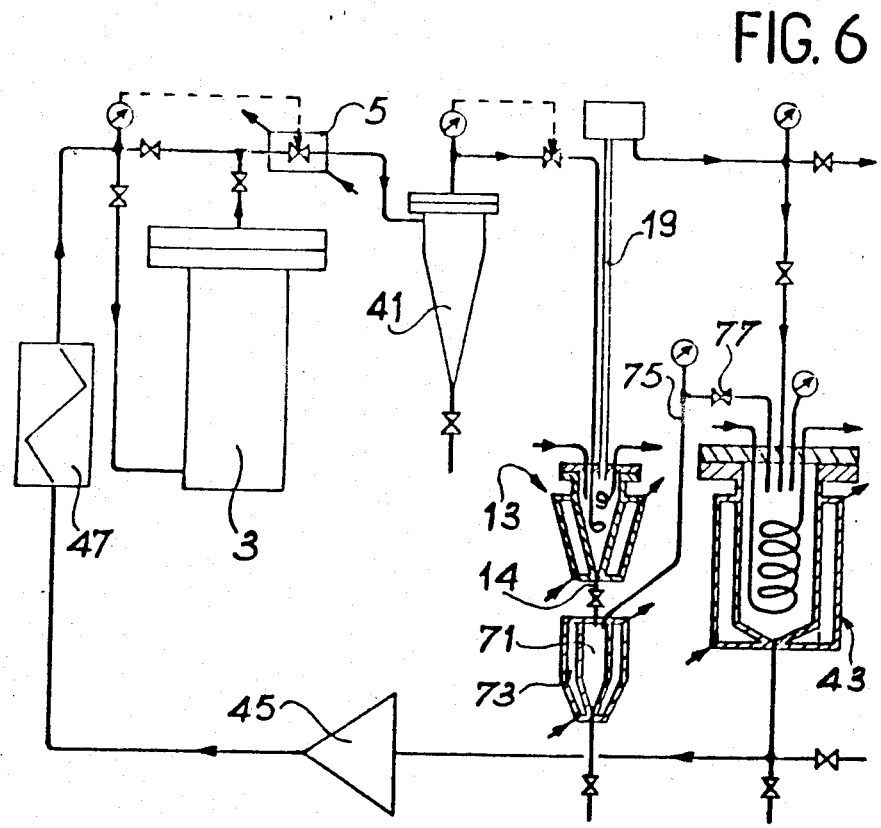

FIG. 6 A third embodiment of a continous extraction installation according to the invention.

In FIG. 1, which is the pressure (in MPa)-temperature (in °C.) phase diagram of carbon dioxide gas $CO_2$, it can be seen that the critical point of the $CO_2$ corresponds to a temperature of 31° C. and a pressure of 7.3 MPa. In addition, the range within which $CO_2$ exists as a supercritical fluid corresponds to the hatched area A. Outside this range, $CO_2$ can exist in the form of a gas in zone B, in the form of a liquid in zone C and in the form of a solid in zone D. The range in which $CO_2$ can exist in the form of a pressurized liquid corresponds to zone C.

On referring now to FIG. 2, which illustrates in a comparative manner an extraction installation not according to the invention, it can be seen that the latter has in conventional manner an extraction fluid generator 1, an extractor 3 and a relief valve 5, provided with a heating system for maintaining the temperature of the expanded fluid at the desired value. A system of lines 7, 9, 11 equipped with valves makes it possible to circulate the extraction fluid in the extractor or pass it directly to relief valve 5. On leaving the latter, the expanded fluid is directly introduced into the gas separator-liquefier 13, which is equipped in its lower part with cooling means, constituted by a jacket 15 in which can circulate a cooling fluid. The upper part of the separator-liquefier can be cooled to a different temperature by circulating a fluid in a coil 17. In its upper part, the separator-liquefier is linked with a vertical column 19 surmounted by a condenser 21 and a heat exchanger 23. A gas discharge pipe 25 connects the gas outlet of the heat exchanger 23 to a relief valve 27 also having a heating system to maintain the temperature of the expanded fluid at the desired value and a pipe 29 connects the relief valve to a gas-liquid separator 31, from which can be extracted the liquid phase by pipe 33 having a valve 34, whilst the gaseous effluents are discharged by pipe 35.

In an installation of this type which does not function according to the inventive process, the extraction fluid leaving extractor 3 is expanded in relief valve 5 at a pressure $p_1$ and a temperature $T_1$ corresponding to zone B of the diagram of FIG. 1, in order to obtain the fluid in the gaseous state, which leads to part of the extracted constituents being passed into the liquid state, because their solubility in the fluid decreases strongly on passing to the gaseous state. This gaseous phase is introduced into the gas separator-liquefier 13, which is cooled to an adequate temperature to obtain the liquefaction of the gas at pressure $p_1$ and whilst keeping the same pressure one passes from zone B to zone C of the diagram of FIG. 1. In this gas liquefier, there is then a rectification of the liquefied phase, which makes it possible to concentrate the constituents extracted in the liquid phase remaining in separator-liquefier 13. Thus, the gaseous phase in equilibrium with the liquid phase at the considered temperature and pressure can be discharged by the vertical column 19 and partly condensed in condenser 21, which makes it possible to wash the gas by the condensed fluid and concentrate the extracted products heated in exchanger 23 to prevent obstruction and then discharged by pipe 25, expanded to the desired pressure in valve 27 and the passed to separator 31, in which it is possible to collect the residual constituents, which are passed into the liquid state during the expansion of the gas in valve 27.

In order to assist the rectification operation of the liquefied phase in the gas separator-liquefier 13, coil 17 is raised to a temperature above that of the fluid circulating in jacket 15, in order to aid the evaporation of the liquefied phase. Moreover, column 19 preferably has a double envelope, so that it can be cooled by fluid circulation between the two envelopes.

In this embodiment, the constituents extracted by the extraction fluid are concentrated in the liquid phase, which remains in separator 13. At the end of the operation, they are separated from the liquefied phase by vaporizing the latter, which makes it possible to recover the constituents in the liquid state. They can then be removed by pipe 14.

FIG. 3 shows an installation according to the invention. The same reference numbers are used herein to designate the components of the installation common to that shown in FIG. 2. Thus, it can be seen that the only difference between the two installations is the introduction of a cyclone-type gas-liquid separator 41 on pipe 7 between relief valve 5 and the gas separator-liquefier 13. The gas outlet of the liquid-gas separator is connected to the separator-liquefier 13 by pipe 12, whilst the separated liquid can be discharged by pipe 42. In this case, following the expansion of the fluid at the desired pressure and temperature in valve 5, part of the extracted constituents which have passed into the liquid state during expansion are separated in separator 41 and the liquefaction and rectification operations are performed on the gas leaving separator 41. The sequence of operations is the same as that described relative to FIG. 2.

The following examples illustrate the results obtained with these two installations during the extraction of the different constituents of the Lavendin solid using supercritical $CO_2$.

COMPARATIVE EXAMPLE 1

In this example, use is made of the installation shown in FIG. 2 and 293.5 g of Lavendin solid is introduced in paste form on to the 6 brass plates of extractor 3, which have a capacity of 1 liter. Supercritical carbon dioxide gas at a temperature of 41° to 42° C., under a pressure of approximately 15 MPa is then circulated in extractor 3 at a flowrate of approximately 437 g/h. The fluid leaving the extractor is expanded in valve 5 at a pressure of 4.7 MPa, whilst being maintained at a temperature of 40° C., is then liquefied in the separator-liquefier 13, which is cooled by circulation of cooling fluid at a temperature of 2° to 6° C. in jacket 15 and a circulation of water at approximately 19° C. in coil 17. In this installation, use is made of a double envelope column 19 with an internal diameter of 4 mm, which is not lined, has a height of 1 m, which is cooled by a fluid at a temperature of 0° to 4° C., whilst also cooling condenser 21 by a fluid at a temperature of 0° to 4° C. The gas leaving condenser 21 has been reheated in exchanger 23 in which circulates a fluid at 60° C., then expanded by valve 27 to atmospheric pressure and then discharged after passing into separator 31.

Under these conditions, after operating for 7 hours the extraction operation was stopped and the constituents extracted in the separator-liquefier 13 by vaporization of the carbon dioxide gas were recovered. The extract quantity collected was 109.48 g, which constitutes an extraction yield of 37.3%.

The relative percentages of the different constituents present in the starting substance and present in the liquid extract collected in separator-liquefier 13 were determined by chromatographic analyis on a capillary column. The results are given in the attached tables 1 and 2 for benzene and the 13 main constituents classified in rising order of volatility.

These results show that the nett overall yield of constituents other than benzene is 36.2% and that the benzene recovery yield, which is the most volatile constituent, is 48%.

EXAMPLE 2

This example makes use of the installation shown in FIG. 3 with a 0.6 l extractor 3 and a 2 m high column 19 lined with balls and 100 g of Lavendin solid are placed therein. Supercritical $CO_2$ is circulated in extractor 3 under a pressure of 9.2 to 10.6 MPa and a temperature of 40° to 48° C. and the fluid leaving the extractor is expanded at a pressure $p_1$ of 4 MPa, whilst keeping its temperature at 40° C. The latter passes into separator 41, where part of the liquid constituents is collected. The gas leaving separator 41 is then passed into liquefier 13, where it is cooled by circulation of cooling fluid with a temperature of 2° to 6° C. in jacket 15 and revaporized in coil 17 heated by water at 19° C. A cooling fluid at 0° to 4° C. is also circulated in the condenser. Under these conditions, after 5.55 hours, 64.72 g of liquid extract is collected in separator 41 and 5.13 g of liquid extract in the separator-liquefier 13, which represents a total quantity of 69.85 g.

The weight percentages of the liquid extract in each of the constituents were analyzed as hereinbefore. These results are also given in the attached tables 1 and 2, where the weight percentages of the constituents in the starting product are also shown.

Determination also took place of the yields of constituents other than benzene corresponding to the extracts collected in separator 41 and liquefier 13. This reveals a yield of 66.4% of constituents other than benzene in cyclone separator 51 and 4.4% of products other than benzene in liquefier 13. The total extraction yield for constituents other than benzene is consequently 70.8% which constitutes a very marked improvement compared with the results obtained with the installation of FIG. 2, where it was 36.2%.

The benzene recover yield is 40%, i.e. substantially identical to that obtained in the installation of FIG. 2.

The benzene content of the liquid extract collected in extractor 41 is 0.78% and that of the extract collected in liquefier 13 is 16.36%. Thus, it can be seen that the separator-liquefier 13 makes it possible to recover the more volatile constituents, such as benzene, which are difficult to collect in separator 41.

COMPARATIVE EXAMPLE 3

For comparison purposes, the constituents of Lavandin solid were extracted in a prior art installation, i.e. in an installation like that of FIG. 2 solely having the supercritical fluid generator 1, extracter 3, relief valve 5 and cyclone separator 41, expansion being effected in valve 5 at atmospheric pressure and ambient temperature.

In the case, 87 g of Lavandin solid paste were placed in extractor 3 and underwent extraction by supercritical $CO_2$ under a pressure of 8 to 10 MPa and a temperature of 40° to 47° C. After 30 hours operation, 28.14 g of liquid extract corresponding to a yield, other than benzene, of 35.7% were collected in a separator 41. Analysis of the liquid constituents collected in separator 41 and analysis of the starting product carried out by capillary column chromatography made it possible to determine the percentages of the different constituents in the starting product and in the liquid extract. These results are given in tables 1 and 2.

These results show that the net overall yield for constituents other than benzene is 35.7% and that the benzene recovery yield is very low, namely below 0.3%, whilst the recovery yields of α-pinene, camphene and β-pinene are close to zero, because these compounds are absent from the chromatographic analysis of the liquid extract. Thus, by carrying out in accordance with the invention the expansion of the fluid at a pressure intermediate between the critical pressure and atmospheric pressure and then liquefying the gaseous phase makes it possible to improve the recovery yield of the very volatile products.

COMPARATIVE EXAMPLE 4

This example uses an installation having a supercritical fluid generator 1, an extractor 3, a first relief valve 5, a separator 41, a second relief valve 27 and a separator 31, i.e. the installation shown in FIG. 3, whilst eliminating the separator-liquefier 13. In this case extraction takes place with supercritical $CO_2$ under a pressure of 11.5 to 11.7 MPa and a temperature of 43° to 44° C. and the supercritical fluid is expanded in valve 5 at a pressure of 3 to 4 MPa at a temperature of 25° C. Into extractor 3 are introduced 27.66 g of substance in the form of a paste and on leaving separator 41 after 22 hours operation, 13.32 g of constituent are collected.

Analysis by capillary chromatography of the constituents of the starting product and the constituents of the liquid extract collected gave the results appearing in tables 1 and 2. These results show that the recovery level of constituents other than benzene is 52.2%, but the benzene recovery yield is only 6%, whilst the α-pinene, camphene and β-pinene quantities are also low.

Thus, when the separator-liquefier 13 is not used, the percentage of extracted and recovered highly volatile constituents drops considerably. The attached table 2 gives the results and operating conditions for examples 1 to 4.

FIGS. 4 to 6 show three embodiments of the extraction installation by supercritical fluid or pressurized liquid operating in a continuous manner and performing the process for the separation of the constituents extracted according to the invention. The same references are used for designating the same components which have already been shown in FIGS. 2 and 3.

FIG. 4 illustrates a first embodiment of a continuously operating installation. It can be seen that it comprises extractor 3, relief valve 5 and separator 41. It is completed by a liquefier 43, a pump 45 and an exchanger 47, which make it possible to recycle into extractor 3 the gas leaving separator 41 after having been raised to the extraction pressure p and temperature T used in extractor 3. According to the invention, this installation also comprises a separator-liquefier 13, which is branched on to the main circuit for recycling the fluid into extractor 3 by a pipe 51 equipped with a valve 53, pipe 51 issuing into the main circuit between separator 41 and liquefier 43.

Extraction takes place in the following way in this installation. In a first phase, the extraction fluid is continuously circulated into extractor 3 and then after expanding the fluid at pressure $p_1$ the extracted constituents which are passed into the liquid state in cyclone separator 41 are separated therefrom. The extracted constituents not separated in separator 41 are concentrated in the gas, which is recycled into extractor 3 via liquefier 43, pump 45 and exchanger 47. Furthermore, at the end of the operation, recovery takes place in a second operating phase of the extracted constituents which have not been separated in separator 41 using the process according to the invention. To this end, all the fluid from the main circuit is passed into liquefier 13. Thus, concentration takes place in the liquid phase present in the separator-liquefier 13 of the remaining constituents, which are then separated from the liquefied gas by vaporization thereof.

FIG. 5 shows another embodiment, of a continuously functioning installation according to the invention. FIG. 5 shows extractor 3, relief valve 5, cyclone separator 41, gas liquefier 43, pump 45 and exchanger 47. In the case of this particular installation, the pipe 42 for discharging the liquid extract from separator 41 and which is equipped with a valve 44 issues into an extract recovery container 61, provided in its lower part with a discharge pipe 63 equipped with a valve 64. Container 61 is connected in its upper part by a pipe 65 having a valve 66 to a gas separator-liquefier 13, which is kept at a pressure just below pressure $p_1$ of cyclone separator 41. In this case, as valve 44 is open, the liquid extract drops into container 61 and the gas which also passes into the latter is directed into liquefier 13, where the other extracted constituents are separated, as previously. The gas which leaves by pipe 25 can optionally be treated and then recycled into the main circuit of the installation. In this installation, it is necessary to top up the fluid in the main circuit, e.g. using pipe 71 to make up the gas losses by pipe 25 of liquefier 13.

FIG. 6 shows a third embodiment of a continuous extraction installation according to the invention. In this case, the installation also comprises a closed main circuit in which are mounted in series extractor 3, relief valve 5, cyclone separator 41, gas liquefier 43, recycling pump 45 and exchanger 47, the separator-liquefier 13 being interposed on the gas circuit between the cyclone separator 41 and gas liquefier 43.

In this case, the discharge pipe 14 from separator-liquefier 13 issues inot an evaporator 71, which can be heated by circulation of a fluid such as water in jacket 73. In its upper part, evaporator 71 is connected via a pipe 75, provided with a valve 73 to gas liquefier 43.

In this installation, the expanded fluid from extractor 3 successively undergoes liquid-gas separation in separator 41, separation by liquefaction and rectification in separator-liquefier 13. The gas leaving column 19 is then recycled via liquefier 43, recycling pump 45 and exchanger 47 into extractor 3. To maintain the gas quantity circulating in the main circuit at the same value, the liquid phase present in the separator-liquefier 13 is treated to evaporate the gas contained therein and recycle it into the main circuit. To this end, discontinuous withdrawal takes place of the liquid phase from liquefier 13 by pipe 14 and the gas is evaporated in evaporator 71 in order to recycle same by pipe 75 into liquefier 43.

TABLE 1

| Constituents | Example 1 | | Example 2 | | Example 3 | | Example 4 | |
| --- | --- | --- | --- | --- | --- | --- | --- | --- |
| | Starting product | Liquid extract | Starting product | Liquid extract | Starting product | Liquid extract | Starting product | Liquid extract |
| | % benzene in the starting product and liquid extract | | | | | | | |

TABLE 1-continued

|  |  | Example 1 | | Example 2 | | Example 3 | | Example 4 | |
| --- | --- | --- | --- | --- | --- | --- | --- | --- | --- |
| Constituents | | Starting product | Liquid extract | Starting product | Liquid extract | Starting product | Liquid extract | Starting product | Liquid extract |
| benzene | | 9.54 | 12.28 | 3.34 | 17.14 | 9.38 | 0.09 | 9.54 | 1.51 |
|  | | evolution of chromatographic profile of 13 main constituents | | | | | | | |
| α Pinene | peak no. 1 | 0.21 | 0.24 | 0.35 | 0.39 | 0.21 | 0 | 0.21 | 0.10 |
| Camphene | peak no. 2 | 0.25 | 0.28 | 0.18 | 0.19 | 0.24 | 0 | 0.25 | 0.14 |
| β Pinene + Sabinene | peak no. 3 | 0.23 | 0.28 | 0.24 | 0.19 | 0.04 | 0 | 0.23 | 0.14 |
| Octanone 3 | peak no. 4 | 0.60 | 0.76 | 0.59 | 0.56 | 0.63 | 0.20 | 0.60 | 0.48 |
| Cineole 1-8 | peak no. 5 | 3.75 | 4.25 | 3.53 | 3.62 | 3.87 | 1.23 | 3.75 | 3.03 |
| Limonene | peak no. 6 | 1.12 | 0.83 | 0.89 | 0.85 | 1.57 | 0.26 | 1.12 | 0.68 |
| cis β ocimene | peak no. 7 | 1.73 | 1.95 | 1.12 | 1.22 | 1.67 | 0.59 | 1.73 | 1.27 |
| trans β ocimene | peak no. 8 | 1.80 | 2.07 | 1.14 | 1.32 | 1.87 | 0.65 | 1.80 | 1.32 |
| Hexyl acetate | peak no. 9 | 0.42 | 0.21 | 0.34 | 0.36 | 0.31 | 0.27 | 0.42 | 0.33 |
| Linalol | peak no. 10 | 32.54 | 30.48 | 36.00 | 36.53 | 32.35 | 31.46 | 32.54 | 31.67 |
| Camphor | peak no. 11 | 6.33 | 6.15 | 6.36 | 6.76 | 6.19 | 5.26 | 6.33 | 6.10 |
| Borneol | peak no. 12 | 3.62 | 2.36 | 2.95 | 3.86 | 3.52 | 3.37 | 3.62 | 3.13 |
| Linalyl acetate | peak no. 13 | 47.41 | 50.15 | 47.33 | 44.16 | 47.54 | 56.69 | 47.41 | 51.64 |

TABLE 2

|  | Ex. 1 | Ex. 2 | Ex. 3 | Ex. 4 |
| --- | --- | --- | --- | --- |
| Supercritical conditons | | | | |
| Pressure (MPa) | 15.5–14.5 | 9.2–10.6 | 0.8–10 | 11.5–11.7 |
| Temperature (°C.) | 41–42 | 48–40 | 40–47 | 44–43 |
| Seperation conditions | | | | |
| Pressure (MPa) | $p_1 = p_2 = 4.7$ | $p_1 = 4$ MPa | $p_1 = 0.1$ MPa | $p_1 = 3$ to 4 |
| Temperature (°C.) | 0 to 4° C. in (13) | 1 to 5° C. in (13) | 25° C. | 25° C. |
| Time in hours | 7.08 | 2 + 3.55 | 29.9 | 22 |
| % by weight of constituents recovered; other than benzene | 36.2 | 66.4 in (41) + 4.4 in (13) | 35.7 | 52.2 |
| % benzene | | | | |
| in starting product | 9.54 | 3.34 | 9.38 | 9.54 |
| in liquid extract | 12.28 | 0.70 in (41) 16.36 in (13) | 0.088 | 1.51 |
| Benzene recovery yield (% by weight) | 48 | 40 | ≦0.3 | 6 |

We claim:

1. Apparatus for the extraction of at least one of the constituents present in a substance by means of an extraction fluid constituted by a supercritical fluid or a pressurized liquid, comprising an extractor (3) within which can be placed said substance, means (9) for circulating the extraction fluid in said extractor under pressure p and temperature T conditions adequate for dissolving the constituent or constituents of the substance in said fluid and a discharge pipe (7) for the extraction fluid leaving the extractor equipped with a relief valve (5) wherein said pipe (7) is connected to the lower part of a gas separator-liquefier (13) provided with cooling means (15, 17) linked by its upper part with a vertical column (19) surmounted by a condenser (21), said gas separator-liquefier (13) being provided in its lower part with means (14) for withdrawing a liquefied phase present in said separator-liquefier and in that a gas-liquid separator (41) is interposed on the gas circuit between the relief valve (5) and the gas separator-liquefier (13).

2. Apparatus according to claim 1, wherein the cooling means (15, 17) of said gas separator-liquefier comprises means for cooling the lower part thereof to a temperature below that of its upper part.

3. Apparatus according to claims 1 or 2, characterized in that condenser (2) located at the upper end of column (19) is surmounted by a heat exchanger (21) for raising the gas leaving the condenser to a higher temperature.

4. Apparatus according to claim 1, wherein the gas-liquid separator (41) is a cyclone separator.

5. Apparatus according to claim 1 which comprises: a closed main circuit having in series the extractor (3), said relief valve (5), a gas-liquid separator (41) and means (43, 45, 47) for recycling the gas leaving said separator (41) into said extractor (3) at the extraction temperature T and pressure p and a gas separator-liquefier (13) linked by its upper part with a vertical column (19) surmounted by a condenser (21), said gas separator-liquefier (13) being branched on to the main circuit be means of a pipe (51) having a valve (53) issuing into said main circuit between the gas-liquid separator (41) and said means (43, 45, 47) for recycling the gas into the extractor (3).

6. Apparatus according to claim 1 which comprises: a closed main circuit having in series the extractor (3), said relief valve (5), the gas-liquid separator (41) and means (43, 45,) said extractor (3) at extraction temperature T and pressure p, a gas separator-liquefier (13) linked by its upper part with a vertical column (19) surmounted by a condenser (21), means for continuously discharging into a container (61) the liquid phase separated in said gas-liquid separator (41) and means for connecting the upper part of the container (61) to the gas liquefier-separator (13) in order to treat therein the gas able to pass from the liquid-gas separator (41) into the container (61).

7. Apparatus according to claim 1 which comprises: a closed main circuit having in series the extractor (3), said relief valve (5), a gas-liquid separator (41), a gas separator-liquefier (13) linked by its upper part with a vertical column (19) surmounted by a condenser (21)

and means (43, 45, 47) for recycling the gas leaving said condenser (21) into the said extractor (3) at the extraction temperature T and pressure p, means (14) for discontinuously sampling the liquid phase present in the gas separator-liquefier (13), means (71) for evaporating the sampled liquid phase and means (75, 77) for recycling the gas separated during the evaporation of the liquid phase sampled in the main circuit between the condenser (21) and the means (43, 45, 47) for recycling the gas into the extractor (3).

* * * * *